March 22, 1949.　　　　　M. R. KARGE　　　　　2,464,813
DEVICE FOR TURNING SLENDER WORK
Filed June 23, 1944　　　　　　　　　　　　　　　5 Sheets-Sheet 1

INVENTOR.
Morris R. Karge

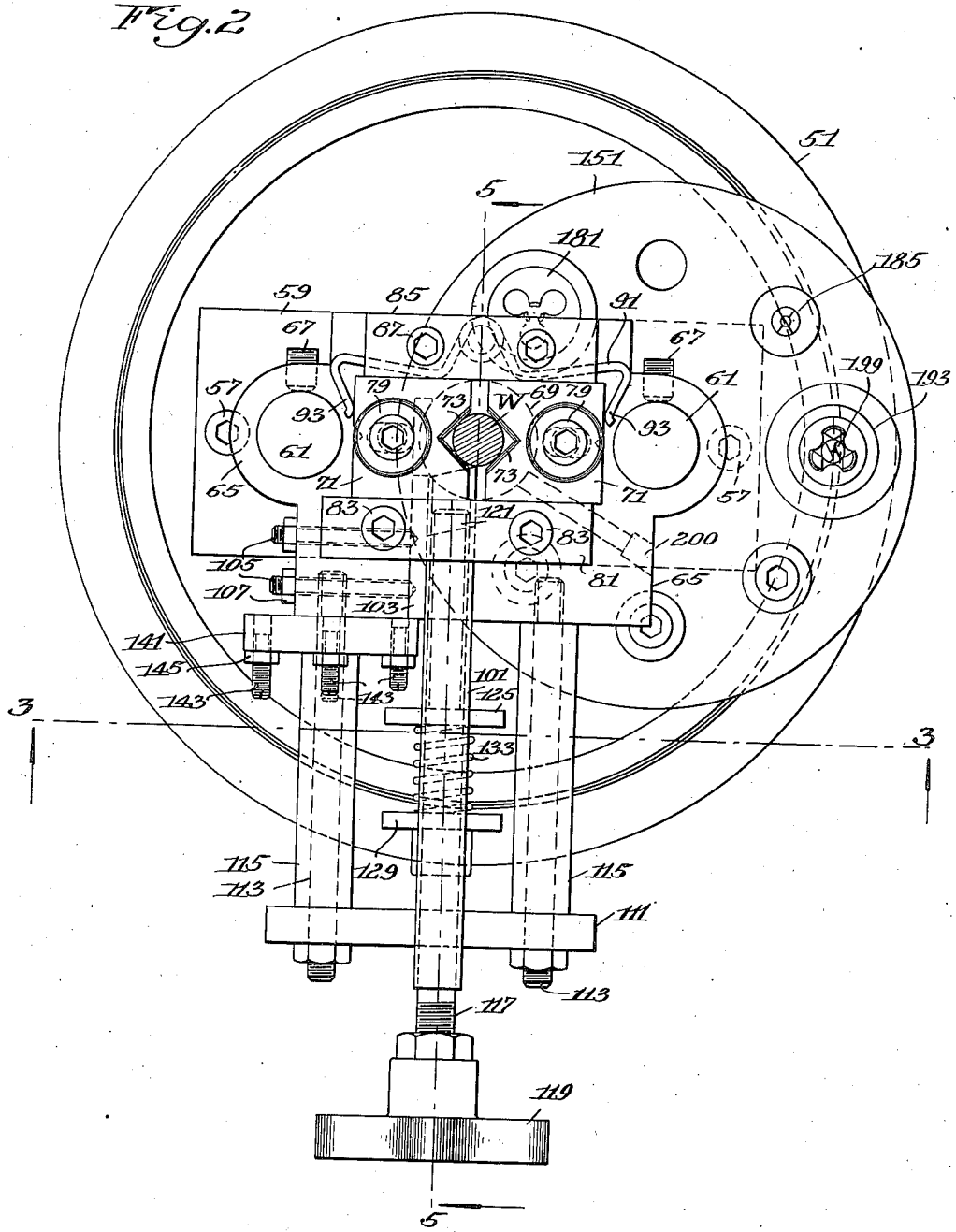

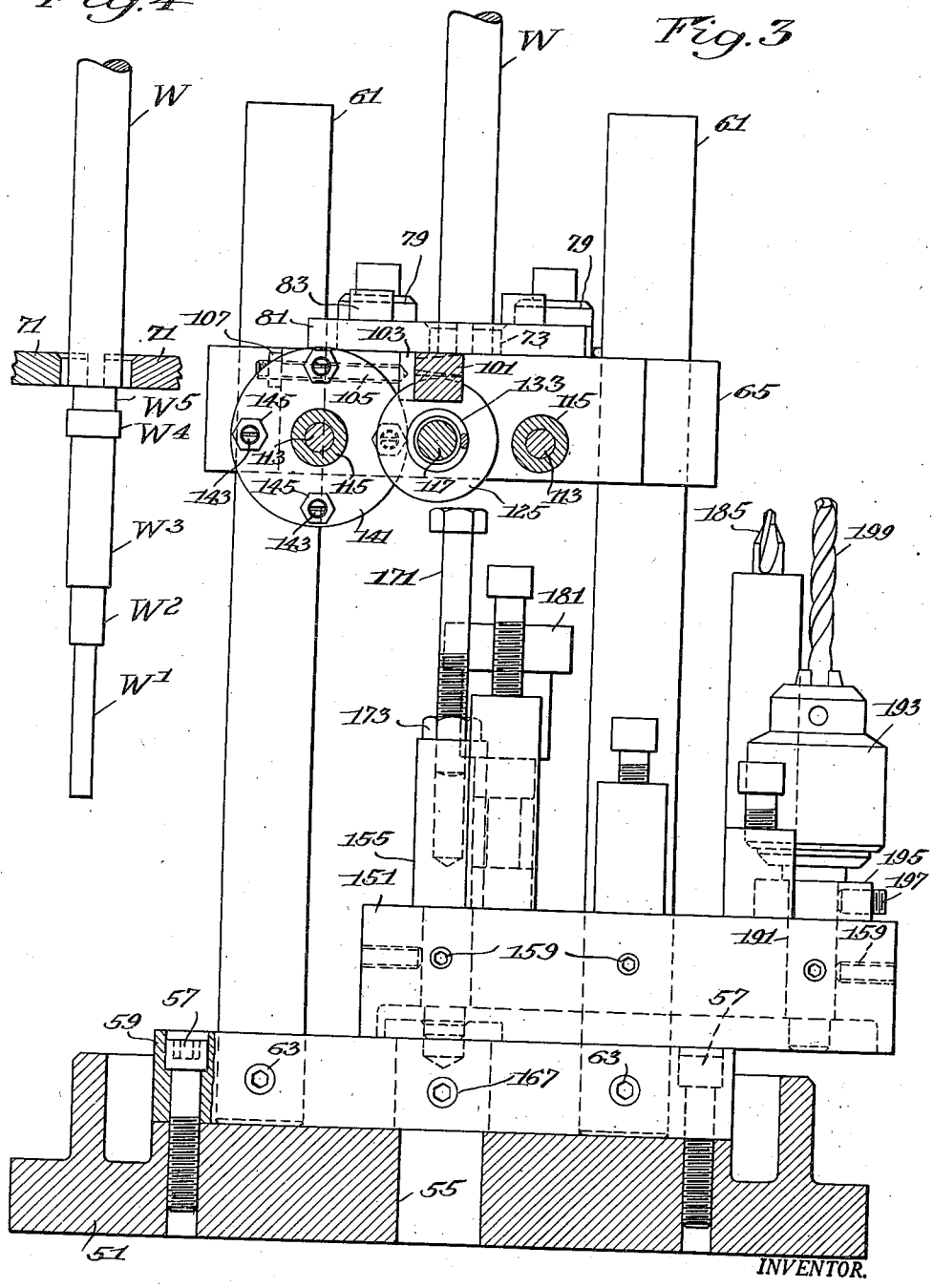

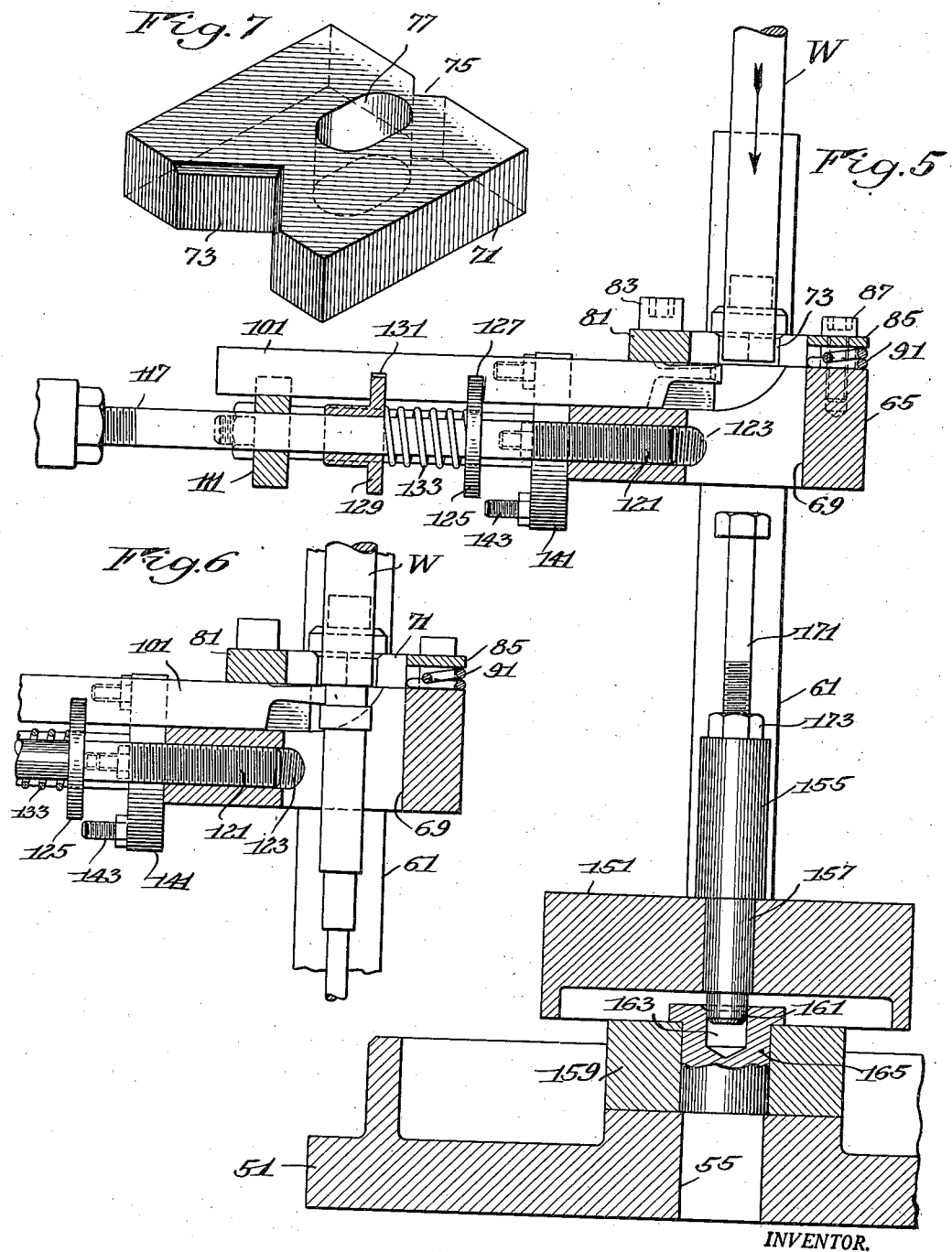

March 22, 1949.                M. R. KARGE                2,464,813
                      DEVICE FOR TURNING SLENDER WORK
Filed June 23, 1944                                    5 Sheets-Sheet 5
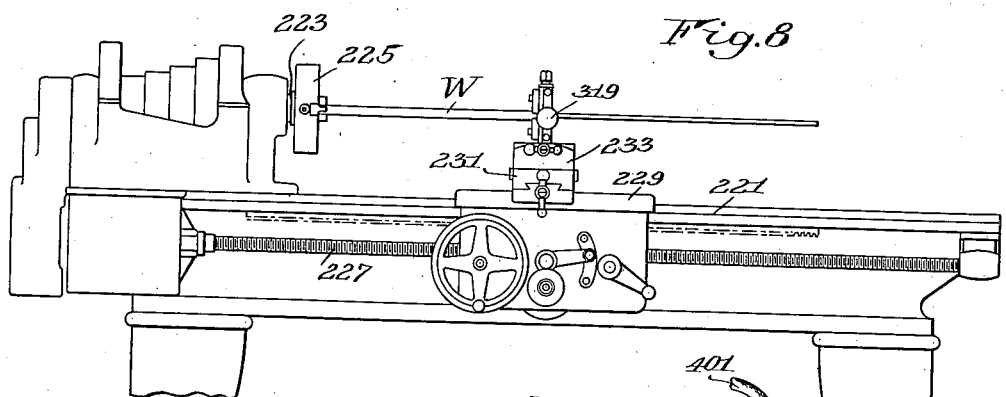
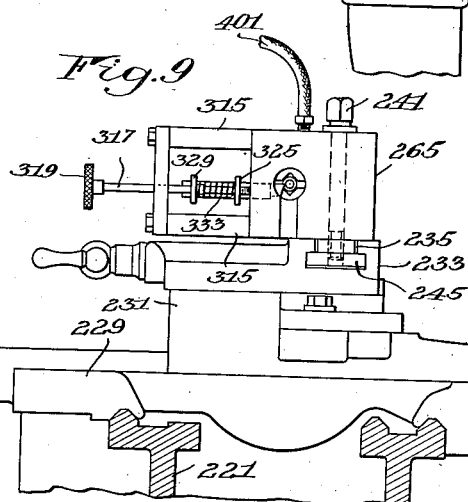
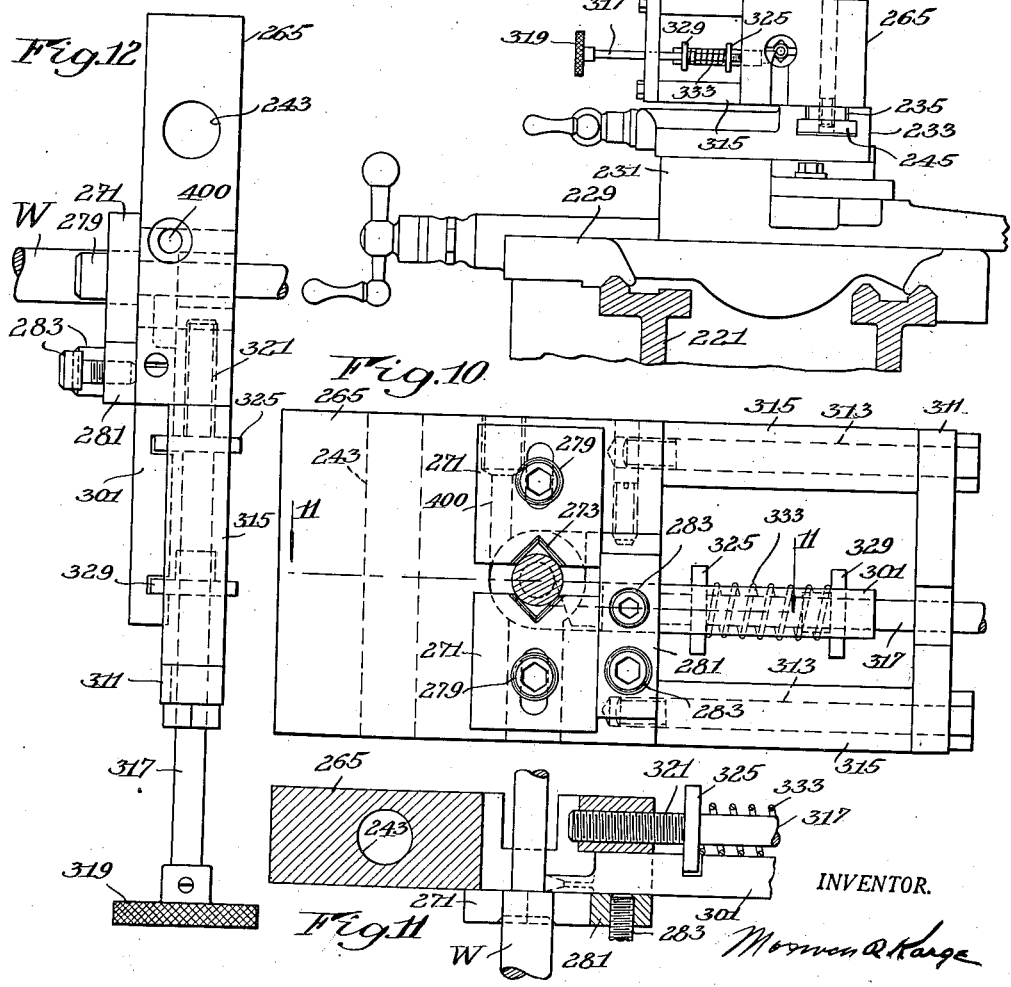
INVENTOR.

Patented Mar. 22, 1949

2,464,813

UNITED STATES PATENT OFFICE 2,464,813

DEVICE FOR TURNING SLENDER WORK

Maxwell R. Karge, Brockport, N. Y.

Application June 23, 1944, Serial No. 541,830

9 Claims. (Cl. 29—39)

This invention relates to a jig or fixture for turning work, and has for one of its principal objects the provision of a generally improved and more satisfactory jig for turning work, so designed and constructed that by using the jig, work may be efficiently and satisfactorily turned on a drill press or the like, without requiring the use of a lathe.

Another object of the invention is the provision of a jig particularly adapted for the efficient and accurate turning of slender work; that is, work which is of relatively small diameter in comparison to its length.

Still another object is the provision of a jig which may be mounted on a conventional lathe as well as on a drill press or the like, and which, when so mounted on a lathe, increases the efficiency and accuracy of the lathe in turning slender work.

A further object is the provision of a work-turning jig including a cutting tool having an improved mounting so designed as to be capable of fine adjustment while at the same time eliminating chatter and back-lash.

Other objects will be apparent from the following description which, together with the accompanying drawings, is intended to be exemplary in character, rather than to be a limitation upon the scope of the invention.

In the drawings:

Fig. 2 is a top plan view of the jig;

Fig. 3 is a vertical section through the jig, taken substantially on the line 3—3 of Fig. 2;

Fig. 4 is a vertical section through a fragment of the jig, showing in side elevation a typical example of slender work turned on this jig;

Fig. 5 is a vertical section taken approximately centrally through the jig, approximately on the line 5—5 of Fig. 2;

Fig. 6 is a view similar to a fragment of Fig. 5, showing the parts in a different position;

Fig. 7 is a perspective view of a guiding block constituting part of the jig;

Fig. 8 is a front elevation of a lathe with an embodiment of the present invention applied thereto;

Fig. 9 is a transverse section taken vertically through the lathe of Fig. 8, illustrating the invention applied thereto;

Fig. 10 is a face view of the jig in the form especially adapted to a lathe, showing the opposite face from that shown in Fig. 9;

Fig. 11 is a fragmentary section taken substantially on the line 11—11 of Fig. 10; and Fig. 12 is an edge view of the jig shown in Figs. 9–11.

The same reference numerals throughout the several views indicate the same parts.

Figure 1:
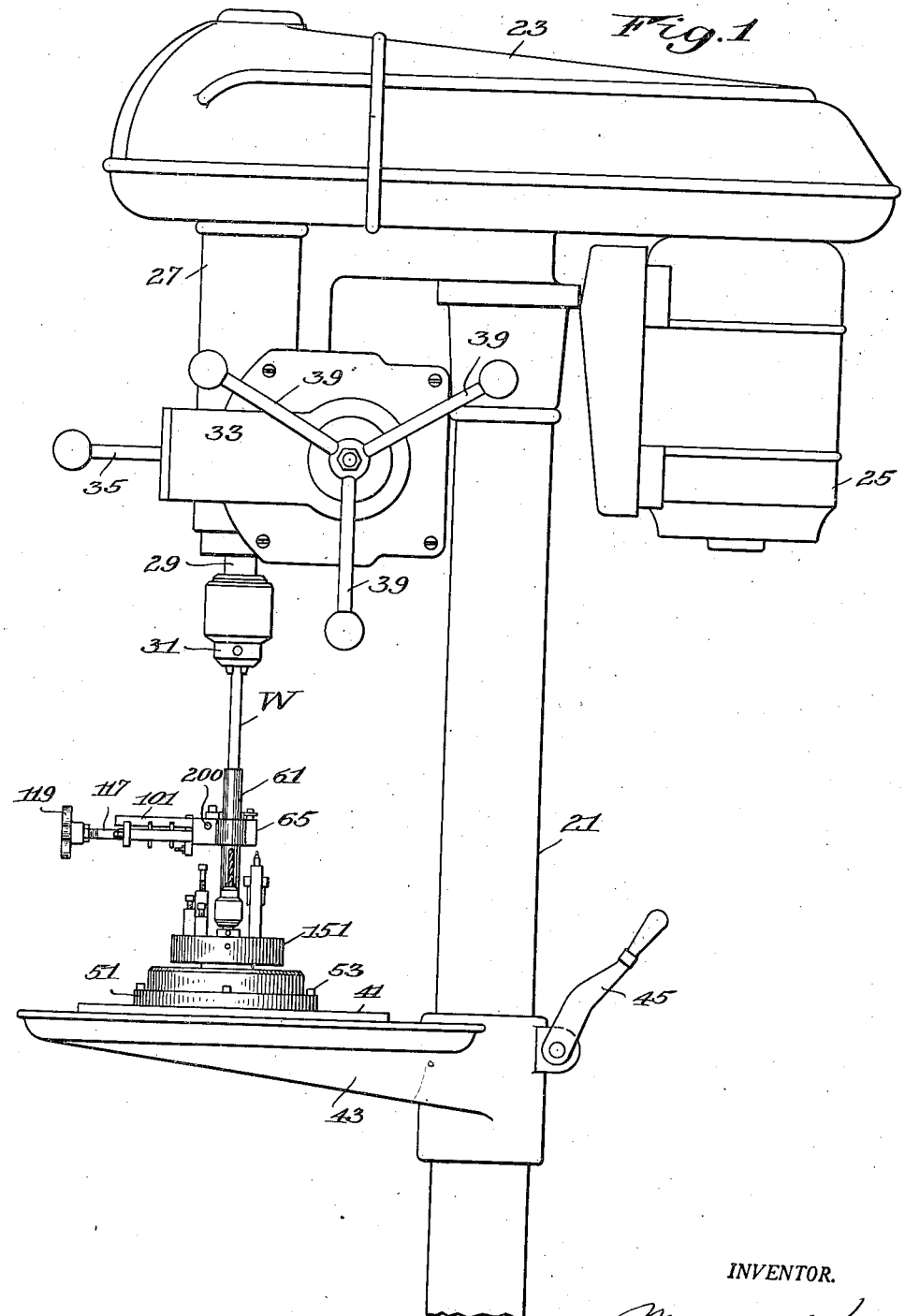
Fig. 1 is a side elevation of a conventional drill press with a preferred embodiment of the jig of the present invention applied thereto.

Referring now to Fig. 1 of the drawings, there is illustrated a fragment of a conventional drill press having a base from which rises a column 21 carrying a head 23 to which is attached an electric motor 25 and a spindle housing 27 containing a rotating spindle 29 driven from the motor 25, and having a chuck 31 at the lower end of the spindle. In a control box 33 is a handle 35 for controlling the rotary movements of the spindle. A feeding shaft 37, when rotated by the arms 39, feeds the spindle 29 downwardly or upwardly, toward or away from a work table 41 mounted on a bracket 43 slidable vertically on the column 21 and capable of being fixed thereto by a clamp 45. All of the parts thus far described may be of any conventional known construction, the details of which form no part of the present invention, it being understood that the present invention may be applied to any known type of drill press, and the particular drill press here shown is illustrated merely as a convenient example.

A drill press is ordinarily not considered the equivalent of a lathe, and in standard machine shop practice one would not attempt to use a drill press to perform the function of a lathe in turning a piece of work or stock to one or more smaller diameters. The present invention provides an attachment which may be used on a drill press to perform such function, however, and which will permit any drill press to be used effectively to turn work, within reasonable limits as to size. The invention is especially adapted to slender work.

Referring now to Figs. 1 and 3 of the drawings, the jig or attachment of the present invention, in its preferred form here shown as an illustrative example, comprises a base plate 51 adapted to be clamped or bolted (as by bolts 53) to the work table 41 of the drill press, in such position that a central hole 55 in the base plate is in axial alinement with the spindle 29 of the drill press. Secured to the base 51 by screws 57 is a plate 59 (Figs. 2, 3, and 5) into which are set the lower ends of two vertical columns 61 held in the plate 59 by set screws 63. Another plate 65 surrounds the columns 61 and is vertically adjustable thereon, being held in any desired elevation by set screws 67 (Fig. 2). This plate 65 has a large opening 69 near its center, this opening being in vertical alinement with the tool spindle 29 and with the opening 55 in the base 51, and being of sufficiently large diameter to accommodate the maximum diameter of work which is to be turned with this jig or attachment.

Slidably mounted on the top surface of the plate 65 are a pair of guiding blocks 71, each of the shape best seen in Fig. 7, having a large V-shaped notch 73 in one edge, a smaller V-shaped notch 75 in the opposite edge, and an elongated slot 77 between the two notches. A pair of screws 79 with enlarged heads pass through the slots 77 and into tapped openings in the plate 65. When these screws 79 are loosened, the two blocks 71 may be moved toward and away from each other until the V-shaped notches bear with the proper tightness upon the work piece or stock to be turned, the larger notches 73 being used for work of relatively large diameter, and the smaller notches 75 being used for smaller work. To prevent the guiding blocks 71 from cocking or turning around their holding screws 79, the blocks are confined at their lateral edges between two guides or gibs, the front one 81 being held by screws 83, and the rear guide 85 being held by screws 87. As best seen in Fig. 5, the front guide 81 is of substantially the same thickness as the blocks 71, but the rear guide 85 is thinner and is set substantially flush with the top of the blocks 71, leaving a space beneath the guide 85 in which is accommodated a resilient spring member 91 having opposed arms 93 embracing the remote ends of the two guiding blocks 71 and resiliently tending to move the two blocks toward each other with equal pressures. As shown in Fig. 2, the spring member 91 has a coiled portion near its center, to give it greater flexibility and resiliency, and the screws 87 which hold the guide member 85 in place serve also to hold the spring member 91 against lateral movement away from the guiding blocks 71.

The plate 65 has in its upper surface a groove or channel in which slides the square shank of a cutting tool 101 having its cutting end formed in a shape appropriate to the character of the cuts to be made. For ordinary turning of cylindrical surfaces of various diameters, the cutting end of the tool is preferably shaped approximately like a conventional cut-off tool; that is, having a substantially "square" cutting edge parallel or almost parallel to the rotary axis of the work, and having side clearance on both sides, as shown in Figs. 5 and 6, and front clearance as shown in Fig. 2, but having little or no top rake. The groove in which the tool 101 slides is so placed in the plate 65 that the cutting edge of the tool is alined accurately with the axis of the work as the tool slides toward and away from the work, and the tool has a snug sliding fit in the groove by virtue of an adjustable gib 103 on one side of the groove, pressed by a pair of adjusting screws 105 held by lock nuts 107.

A cross piece 111 (Fig. 2) is secured to the plate 65, at some distance forwardly therefrom, by means of two bolts 113 passing through spacing sleeves 115. The upper edge of this piece 111 is notched to help guide the cutting tool 101, as indicated in Fig. 5. Through this piece 111, below the tool, is a hole in which is rotatably and slidably mounted an adjusting screw 117, the forward end of which carries a convenient knob or handle 119, and the rear end of which is provided with screw threads 121 engaging threads in a tapped opening 123 in the plate 65. A disk-like collar 125 fixed to the screw 117 has its marginal edge engaged in a notch 127 (Fig. 5) in the bottom of the cutting tool 101. A second disk-like collar 129 is rotatably and slidably mounted on the screw 117 a short distance in front of the collar 125, and engages in a second notch 131 in the bottom of the tool 101. A coil spring 133 surrounds the screw 117 between the two collars 125 and 129, reacting rearwardly against the fixed collar 125 and pressing forwardly against the movable collar 129 at all times, thus tending to pull the tool 101 forwardly (away from the work) at all times and keeping it in tight engagement with the rear surface of the collar 125, eliminating all chatter or back-lash of the tool and resulting in a very smooth and delicate feeding of the tool when the screw 117 is turned.

It will be noted from Fig. 5 that the cutting edge of the tool 101 is directly under and right next to the lower surfaces of the guiding blocks 71, with no gap whatever between the cutting edge and the guiding blocks. From this it follows that, no matter how slender the work may be, there is no chance for the work to spring or bend while being turned, and results of the greatest accuracy can be attained easily. The original or unturned diameter of the work or stock is at all times guided and held securely by the guiding blocks 71, and as the work is fed downwardly through the plate 65, it is turned to the proper diameter by the action of the cutting tool 101 (the work meanwhile being rotated, of course) acting so close to the guiding blocks 71 that there is no chance for the work to bend or spring, no matter how small the diameter to which it is turned.

To gauge the diameter to which the work is to be turned, a suitable gauge block or measuring device may be used to gauge or measure the distance between the collar 125 and the fixed front edge of the plate 65. More conveniently, however, there may be used an adjustable stop for the collar 125, or preferably a series of adjustable stops mounted on a turret. To this end, there is provided a circular member 141 (Figs. 2, 3, and 5) rotatably mounted on one of the members 115 adjacent the front surface of the plate 65. This member 141 constitutes a turret carrying any desired number of adjustable stops, such as the four stop screws 143 shown in Fig. 3, each held by a locking nut 145. By turning the turret 141, any one of the stops 143 may be selectively brought into effective position behind the collar 125 so as to limit the feeding of the tool 101 into the work. If the work to be turned is to have several different diameters at different portions of the work, the stops 143 may be set in accordance with these different diameters. For the first diameter, at the bottom end of the work, the appropriate stop is brought into position behind the collar 125, and the knob 119 is turned to feed the tool into the bottom end of the work until the collar 125 comes into contact with the stop 143, preventing further feeding of the tool. Then the work is fed downwardly longitudinally until the required length of the work is turned to this diameter to which the tool is set. Then the tool is backed off, the turret 141 is turned to bring the next stop 143 behind the collar 125, and the same procedure is repeated to turn the next lengthwise section of the work to the proper diameter.

A series of adjustable stops may also be used for conveniently controlling the longitudinal feeding of the work, to determine the proper lengths of the various sections of the work to be turned to various different diameters. To this end there is provided a turret member 151 (Figs. 2, 3, and 5) rotatably mounted on one of the vertical posts or standards 61 near its lower end, just above and substantially in contact with the upper surface of the plate 59. This turret 151 has its bottom surface recessed as seen in Fig. 5, and the turret is provided with a concentrically arranged series of vertical holes or bores extending entirely through the thickness of the turret, all at such distance from the center of rotation of the turret that these holes may be selectively brought into exact vertical alinement with the axis of rotation of the work. In these holes may be removably mounted suitable stop members for controlling the downward feeding movements of the work, or alternatively, suitable tools for operating upon the work, such as threading dies, taps, drills, etc.

Each stop member may comprise, for example, a shank 155 (Fig. 5) of one diameter extending upwardly from the top surface of the turret 151, a portion 157 of smaller diameter fitted snugly into one of the vertical holes in the turret 151 and held therein by a set screw 159 (Fig. 3), and a bottom end portion 161 (Fig. 5) of still smaller diameter, projecting below the recessed bottom of the turret 151 but not below the depending marginal rim on the bottom, and fitting snugly into a hole 163 in a plug 165 mounted removably in the central bore in the plate 59, and held therein by a set screw 167 (Fig. 3). By lifting the turret 151 (which slides vertically easily on the column 61 on which it is pivoted) the portion 161 is lifted out of the plug 165 and the turret may then be rotated to bring any selected one of the stop members or the tools to the effective working position; then the turret may be dropped downwardly a short distance, seating the portion 161 of the selected stop or tool in the hole 163 of the plug 165, which accurately alines the selected stop or tool with the rotary axis of the work.

The stop members each further comprise a screw 171 (Fig. 5) screwed into a vertical tapped opening in the shank 155, and a lock nut 173 holding the screw in any desired position of adjustment. When the lock nut is loosened, the screw may be screwed upwardly or downwardly in the shank 155, thus varying the height of the head of the screw, which serves as the abutment or stop to limit the downward feeding movement of the work. The depending marginal rim on the turret 151 rests evenly on the top surface of the plate 59, thus controlling the elevation of the turret, and in turn controlling the elevation of the head of the screw 171 so that it may accurately limit the downward feeding movement of the work or stock, indicated at W in the drawings.

The turret 151 may carry any desired number of abutment screws or stop members 171 of varying heights, each controlling the downward feeding of the work through a certain length which is to be turned to a given diameter. Four such stop members are indicated in the drawings, particularly Figs. 2 and 3. In addition to these stops, various tools for operating upon the work may also be mounted on the turret 151, in adapters or holders identical with or similar to the parts 155, 157, and 161 already described. For example, there may be a threading die 181 (Figs. 2 and 3) held on a shank similar to the shank 155, 157, 161, mounted in one of the holes in the turret 151. In another such hole there may be a similar shank carrying a center drill 185. In still another such hole there may be mounted the shank 191 (Fig. 3) of a chuck 193, the shank being held against downward movement not only by the set screw 159 but also by a collar 195 resting on the top surface of the turret 151 and having a heavy duty set screw 197 engaging the shank 191. This shank, like the other shanks 155, has at its lower end a reduced portion to fit into and be centered by the hole 163 in the plug 165. The chuck 193 may hold any desired tool for operating upon the work, such as the drill 199. The particular tools to be placed in the chuck 193 or elsewhere on the turret 151 will be varied from job to job, of course, depending upon the operations to be performed.

The operation of the device is as follows: The various stops 171 are set in accordance with the lengths of the various parts of the work which are to be turned to different diameters. The various stops 143 are set in accordance with the different diameters to be turned. The work W is chucked in the chuck 31 of the drill press, and the guiding blocks 71 are adjusted to bear firmly and evenly on the unturned diameter of the work piece. When the screws 79 are loosened, the spring 91 automatically equalizes the bearing pressure of the two guiding blocks 71, and then the screws 79 are tightened to hold the blocks immovably. The turning always proceeds from the bottom end of the work upwardly, as this permits the feeding to be always in a downward direction, so that the guiding blocks always fit on and guide the work at a point where it is still of the original unturned diameter. The turning from the original diameter to the finished diameter is accomplished in a single cut, regardless of how great a reduction in diameter is to be made.

All operations to be performed by tools mounted on the turret 151 are performed at as early a stage as possible, preferably before the turning operations are commenced. This is especially true of any drilling operations that may be required. It will be noted that the center drill 185 and the drill 199 are both set quite high, just beneath the bottom of the plate 65, with barely room to lift the turret 151 enough to swing it around. Thus, if any boring or center drilling is to be performed on the work, the drills will operate on the end of the work at a point close below the guiding blocks 71, and the work (still of its full unturned diameter at this time) has no appreciable chance to spring laterally while being drilled. During the drilling operation, of course, the drill remains stationary, and is accurately centered in alinement with the work by the shank of the drill support being in the hole 163 of the plug 165. The work W turns with the spindle 29 of the drill press, and is fed downwardly onto the drill 199 or 185 by means of the feeding handle 39.

When all drilling operations are completed, the work is elevated to such position that the bottom end of the work is opposite the cutting end of the cutting tool 101, and the turret 151 is turned so that the first stop 171 is alined with the work, and the turning operation is commenced. The drill press spindle 29 is set to rotating, and the feed knob 119 of the cutting tool 101 is turned to advance the tool to reduce the diameter of the work to the proper finished diameter for the first or lowermost portion thereof. The flange 125 then comes into contact with the appropriate one of the stops 143, limiting further feeding movement of the cutting tool and indicating that the proper diameter has been reached. Then, leaving the cutting tool set in this position, the work is fed downwardly by moving the drill press feeding handle 39, and as this downward feeding continues the cutting tool 101 turns the work to this same diameter, cutting now being accomplished, not by the end of the tool, but by the side edge thereof (the upper edge as viewed in Fig. 5) which makes its cut immediately adjacent to the point where the work is guided by the guiding blocks 71, so there is no chance for the work to spring laterally, no matter how slender it may be.

As the downward feeding of the work continues, the bottom end thereof finally comes into contact with the alined stop 171, indicating that the proper length of work has been turned to this diameter. The work is then backed off (upwardly) enough to permit the turret 151 to be raised enough to disengage the portion 161 from the hole 163, and the turret is swung around to bring the next stop 171 into alinement with the work. The cutting tool 101 is backed off enough to allow the small turret 141 to be turned to bring the next stop 143 into alinement with the flange 125. Then the steps above described are repeated, first moving the cutting tool 101 inwardly (without longitudinal feeding of the work) until the flange 125 comes into contact with the stop 143, to indicate the proper depth of cut, and then feeding the work longitudinally downwardly (without altering the position of the cutting tool) until the proper length of work has been turned to this diameter, indicated by the bottom end of the work coming into contact with the stop 171 alined therewith.

This process is repeated as often as may be necessary to turn the various parts of the work to the various required diameters. Any number of different diameters may be turned on the same work piece, and each of these diameters may be of any desired length, within reasonable limits. Each diameter turned may be either greater or less than the adjacent diameter previously turned. As a typical illustrative example, there is shown in Fig. 4 a piece of work turned to a relatively small diameter section W1, following which is a shorter section W2 of greater diameter, then a longer section W3 of still greater diameter, then a short collar-like section W4 of still greater diameter, then a portion W5 of smaller diameter. It has been found possible with this apparatus to reduce a ½ inch rod to a diameter of $\frac{1}{16}$ inch in a single cut and with the greatest accuracy, there being no opportunity for the rod to spring laterally so as to make the turned diameter inaccurate.

The longer the work to be turned, the higher the plate 65 may be placed on the posts 61, by loosening the set screws 67 and moving the plate upwardly, then tightening the screws again. If, however, it is desired to turn a piece of work even longer than the maximum distance from the cutting tool 101 to the turret 151, then the plug 165 may be removed and a hole in the turret 151 may be brought into alinement with the work, so that as the downward feeding of the work continues, it may pass through the hole in the turret and on down through the hole 55 in the base 51 and, if desired, on down through a corresponding hole in the work table 41 of the drill press.

The foregoing fixture finds its greatest usefulness in connection with a drill press, enabling the production on a drill press of turning work never heretofore thought to be within the capabilities of a drill press. However, the fixture may also be used to good advantage on machine tools of other kinds and types.

For example, the entire fixture above described, less only the base plate 51 which may be removed and discarded, can be turned on its side and mounted (by means of a suitable bracket) on the tool post of a conventional lathe, thus enabling the lathe to be used for the production of long slender work not otherwise within the capabilities of the lathe.

It is also possible to use, on a conventional engine lathe, a somewhat simplified form of the fixture, as shown in Figs. 8 to 12, inclusive, reference to which is now made.

In Fig. 8 is shown an engine lathe of any known form, having for example a bed 221, a spindle 223 carrying a chuck 225, and a lead screw 227 for feeding a carriage 229 having a cross slide 231 on which may be mounted a compound slide 233 having a T-slot 235 in which the conventional tool post is normally mounted.

According to this simplified form of the present invention, the tool post is removed and is replaced by a screw 241 passing through a hole 243 (Fig. 10) in a plate 265, and screwed into a nut 245 (Fig. 9) in the T-slot 235, so as to hold the plate 265 firmly and rigidly on the slide 233. This plate 265 is essentially similar to and performs the same function as the plate 65 in the form of invention previously described, and carries, on its lateral face toward the chuck 225, a pair of guiding blocks 271 (Fig. 10) similar to the guiding blocks 71, having notches 273 for embracing the unturned diameter of the work, and having also long holding slots 277 through which the holding screws 279 extend. A block 281 held by screws 283 serves, like the block 81 in the previous embodiment, to hold the guiding blocks 271 against cocking.

The plate 265 is, like the plate 65, provided with a channel immediately next to the guiding blocks 271, and in this channel is longitudinally movable a cutting tool 301 like the tool 101 previously described. This tool likewise has two notches, engaged by a fixed flange 325 and a movable flange 329 on the shank 317 of the adjusting screw 321, there being a coiled spring 333 between the two flanges, performing the same function as the spring 133 previously described. Turning the knob 319 on the screw 317 serves to feed the tool 301 toward or away from the work. This screw is supported in part by a bar 311 held by screws 313 and spacers 315 attached to the plate 265.

The operation of this simplified form of fixture is essentially the same as that of the form previously described, except that here the work W has its axis horizontal instead of vertical, and the traversing of the tool relative to the length of the work is not accomplished by feeding the work longitudinally, but rather by feeding the carriage 229 leftwardly when viewed as in Fig. 8. As before, the guiding blocks 271 always contact with the original or unturned diameter of the work, and the turning always proceeds leftwardly, beginning at the right hand end of the work, the work being turned to finished diameter in a single cut. Stop members identical with the stop screws 143 may be used, if desired, in this second form of the invention. The turret 151 and its associated stop members for controlling the longitudinal feeding movements are omitted in this form, however, and the proper lengths of the various turned portions of the work are controlled or determined by using suitable gauges or scales or other conventional measuring devices.

The use of this second form of fixture will be obvious to those skilled in the art, especially in view of the detailed description of the use of the first form. During the turning operation, the work is rotated, of course, by rotation of the lathe spindle 223 in the conventional way, the work being held by the chuck 225 or by a collet or other suitable holding means. The longitudinal feed is accomplished by moving the carriage 229, either by turning the usual hand wheel, or by using the automatic feed. Extremely long and slender work may be turned with the greatest accuracy, the relative proportions shown in Fig. 8 being no exaggeration of what may be readily accomplished.

In both forms of device, because of the relatively deep or heavy cuts that must sometimes be made, it is desirable to provide a steady supply of coolant or cutting oil at the point of operation of the cutting tool. This is readily done by connecting a coolant or oil supply, through a hose or the like, to the oil duct 200 (Fig. 2) in the plate 65, which carries the oil to the work immediately adjacent the tool 101. In the second form, the coolant or oil supply is connected (as by a hose 401) to the oil duct 400 (Fig. 10) formed in the plate 265.

The turning of very slender work has long been considered an exceptionally difficult task, because of the lateral "spring" of the work and the consequent liability to inaccuracy. It is seen that the present invention not only solves this important problem, in an efficient and thoroughly satisfactory way, but also opens up vast new possibilities in connection with drill presses, enabling the owner of a conventional drill press readily and efficiently to produce turned work of the greatest precision, equal in quality to work heretofore thought possible of production only on a high grade and expensive lathe, and then only with great difficulty. Thus the present invention is a distinct advance in the art, and provides the means for greatly increased production of small turned parts.

It will be understood that the invention may be carried out in a number of ways, and that the forms above described are merely illustrative and exemplary. It is intended to include within the scope of this invention all variations and modifications falling within the scope of the appended claims.

What is claimed is:

1. A work turning device including a first member extending generally transversely to the rotary axis of the work to be turned, guiding means adjustably mounted on said first member to engage and guide the work, a channel formed in said first member and extending in a general direction toward and away from the rotary axis of the work, a cutting tool mounted and guided in said channel for movement along said channel, said cutting tool having two spaced abutment shoulders, a feed screw mounted on said first member and extending substantially parallel to said cutting tool, a flange fixed to said feed screw and bearing forwardly against one of said abutment shoulders of said cutting tool to advance said tool when said feed screw advances, a collar slidably mounted on said feed screw and bearing rearwardly against the other of said abutment shoulders of said cutting tool, and a spring urging said collar rearwardly to tend to move said cutting tool rearwardly to hold it constantly in engagement with said flange of said feed screw.

2. A work turning device including a first member extending generally transversely to the rotary axis of the work to be turned, guiding means adjustably mounted on said first member to engage and guide the work, a channel formed in said first member and extending in a general direction toward and away from the rotary axis of the work, a cutting tool mounted and guided in said channel for movement along said channel, said cutting tool having an abutment shoulder, a feed screw mounted on said first member and extending substantially parallel to said cutting tool, a flange fixed to said feed screw and bearing forwardly against said abutment shoulder to advance said tool when said feed screw advances, a rotary member mounted on said first member for rotation about an axis substantially parallel to said cutting tool and feed screw, and a plurality of adjustable stops mounted on said rotary member in such position that by rotating said member any selected one of said stops may be brought into cooperative relation to said flange to limit the advancing movement of said feed screw and cutting tool.

3. A work turning device including a first member extending generally transversely to the rotary axis of the work to be turned, a pair of guiding blocks movably mounted on said first member and having V-shaped notches for engaging the work to be turned to hold said work against lateral deflection, spring means reacting equally against both blocks to tend to move them toward each other to engage the work with substantially equal pressure, means for clamping said guiding blocks immovably in adjusted position with respect to said first member, and a cutting tool mounted on said first member for engaging the work closely adjacent said guiding blocks.

4. A work turning device for use with a drill press having a rotary spindle capable of axial feeding movement and a work table, said device comprising a base adapted to be mounted on said work table, a support rising from said base, a first member mounted on said support and extending generally transversely to the rotary axis of said spindle, said first member having an opening through which may extend the work to be turned, the work being in axial alinement with and secured to said spindle, guiding means adjustably mounted on said member for engaging the unturned diameter of the work to hold the work against lateral deflection, a cutting tool mounted on said first member for operating upon the work closely adjacent said guiding means, a rotary member mounted on said base for rotation below said first member about an axis substantially parallel to the rotary axis of said work, and a plurality of sockets on said rotary member adapted to receive optionally either stop members for limiting the downward feeding movement of the work or tools for operating upon the work when it is fed downwardly, any selected one of said stop members or tools being capable of being brought into alinement with the work by rotation of said rotary member.

5. A construction as described in claim 4, further including a recess in said base in axial alinement with the work, and a downwardly projecting portion on each of said stop members and tools for seating in said recess to aline the selected stop member or tool accurately with the axis of the work.

6. A work turning device including a plate having an opening through which the work to be turned extends, said plate being out of contact with the work, said plate having a flat surface lying substantially in a plane perpendicular to the rotary axis of the work and also having a channel adjacent said surface and extending in a direction substantially intersecting the rotary axis of the work, a pair of guiding blocks slidably mounted on said flat surface on opposite sides of the rotary axis of the work, said blocks having notches for receiving and bearing against the unturned diameter of the work to hold the same against lateral deflection, a spring reacting against both blocks and tending to press both of them equally toward the work, clamping means for clamping both of said blocks immovably to said plate, and a cutting tool longitudinally slidable in said channel and having a cutting edge for operative engagement with said work closely adjacent the plane of said flat surface.

7. A work turning device including a first member extending generally transversely to the rotary axis of the work to be turned and having an opening for passage therethrough of the work, a cutting tool mounted on said first member for cutting the work during rotation thereof, a guiding member adjustably mounted on said first member for contact with the unturned diameter of the work to prevent lateral deflection thereof while being cut by said cutting tool, a rotary member mounted for rotation about an axis substantially parallel to and offset from the rotary axis of the work, a plurality of holders mounted on said rotary member at substantially equal distances from the rotary axis of said rotary member so that by turning said rotary member an implement mounted in any selected one of said holders may be brought into axial alinement with the work for direct contact with the work when the work is moved longitudinally, a second member having an opening therein, and a plurality of plugs carried by said rotary member, any selected one of which may be engaged in said opening to center the selected holder of said rotary member accurately in alinement with the work being turned.

8. A work turning device including a base, a plurality of posts secured to and rising from said base, a transverse plate mounted on said posts, said plate having an opening therethrough for passage of the work to be turned, a plurality of guiding members adjustably mounted on said plate for contact with the work to prevent lateral deflection of the work while being turned, a channel in said plate, said channel extending in a direction substantially radial to the rotary axis of the work, a cutting tool having a shank mounted in said channel for longitudinal feeding movement therein, a rotary member in the general form of a disk mounted for rotation about one of said posts in a position overlying said base, and a plurality of implement holders mounted on said rotary member in such positions that by turning said rotary member about the post on which it is mounted, any selected one of said implement holders may be brought into axial alinement with the work being turned.

9. A work turning device including a base, a plurality of posts secured to and rising from said base, a transverse plate mounted on said posts, said plate having an opening therethrough for passage of the work to be turned, a plurality of guiding members adjustably mounted on said plate for contact with the work to prevent lateral deflection of the work while being turned, a channel in said plate, said channel extending in a direction substantially radial to the rotary axis of the work, a cutting tool having a shank mounted in said channel for longitudinal movement therein, a rotary member in the general form of a disk mounted for rotation about one of said posts in a position overlying said base, a plurality of implement holders mounted on said rotary member in such positions that by turning said rotary member about the post on which it is mounted, any selected one of said implement holders may be brought into axial alinement with the work being turned, a recess in said base, and a plurality of projections on said rotary member, one associated with each implement holder, for seating in said recess to insure accurate alinement of the selected implement holder with the rotary axis of the work being turned.

MAXWELL R. KARGE.

REFERENCES CITED

The following references are of record in the file of this patent:

UNITED STATES PATENTS

| Number | Name | Date |
|---|---|---|
| 458,325 | Gifford | Aug. 25, 1891 |
| 968,489 | Milne | Aug. 23, 1910 |
| 979,551 | Olson | Dec. 27, 1910 |
| 1,036,257 | Kacsmarik | Aug. 20, 1912 |
| 1,121,188 | Leveque | Dec. 15, 1914 |
| 1,122,713 | Fisher | Dec. 29, 1914 |
| 1,235,914 | Murrie et al. | Aug. 7, 1917 |
| 1,479,203 | Oddsen | Jan. 1, 1924 |
| 1,523,958 | Hanson | Jan. 20, 1925 |
| 1,906,100 | Richardson | Apr. 25, 1933 |
| 1,979,252 | Chedester | Nov. 6, 1934 |
| 1,992,558 | Turnepseed | Feb. 26, 1935 |
| 2,036,436 | Quichon | Apr. 7, 1936 |
| 2,094,994 | Lovely | Oct. 5, 1937 |
| 2,114,926 | Kneff | Apr. 19, 1938 |
| 2,155,573 | Wells | Apr. 25, 1939 |
| 2,277,613 | Swenson | Mar. 24, 1942 |